United States Patent Office 3,551,452
Patented Dec. 29, 1970

3,551,452
3-OXIMINO-BENZO-1,2-DITHIOLS
Agostino Baruffini, Pavia, Pietro de Pietri Tonelli, Milan, Franco Gialdi, Pavia, Giovanni Pellegrini, Milan, and Riccardo Ponci, Pavia, Italy, assignors of fifty percent to Montecatini Edison S.p.A., Milan, and fifty percent to Agostino Baruffini, Franco Gialdi, and Riccardo Ponci, Milan and Pavia, Italy
No Drawing. Filed July 14, 1967, Ser. No. 653,329
Claims priority, application Italy, July 18, 1966, 16,594/66
Int. Cl. A01n 9/12; C07d 79/00
U.S. Cl. 260—327                                                      6 Claims

ABSTRACT OF THE DISCLOSURE

Disclosed are antifungus compositions containing as an active ingredients at least one compound with the class

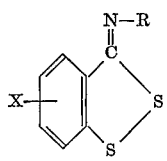

wherein H=halogen, nitro or monovalent alkyl and R=hydroxy or acyloxy.

---

The present invention has as its objects substances having an anti-fungus action, deriving from benzo-1,2-dithio-3-thione (benzo-trithione), a process for preparing them, compositions containing them and their use for preventing and controlling the damage caused by fungi.

We have surprisingly found that the compounds obtained by treating benzotrithione or its derivatives of the formula

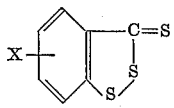

in which X=alkyl, halo, or nitro, with hydroxyamine and successively with acyl halides or anhydrides of acids, have a remarkable anti-fungus activity and can thus be usefully utilized in agriculture to protect plants against the attack of said parasites.

Benzotrithione is a known substance. It can be obtained with a good yield (according to Fs. Fowkes and E. W. Clelland, J. Chem. Soc. 1941, p. 187) by treating 2,2′-dithio-benzoic acid, dissolved in 10 times its weight of anhydrous pyridine, with an equivalent amount of phosphorous pentasulfide and refluxing for 1 hour. After cooling, the reaction mixture is diluted with 4 volumes of water. After standing for 1 hour at 0° C., the precipitate is filtered and washed with water. By crystallization from benzene, benzotrithione having a melting point of 94–96° C. is obtained in the form of orange needles. This compound can also be obtained through other ways, e.g. from methyl-cyclohexene and sulfur (Noël Lorac and Luis Legrand Compt. rend. 282, 2330–2 (1951)) or from thiocresol with sulfur (U.S. Pat. 3,040,057).

The benzotrithiones having a substituent in the benzene nucleus are analogously prepared.

The substances deriving from benztrithione, substituted or not in the benzene nucleus, which form the object of the present invention, are in the class defined by Formula 1:

(1)

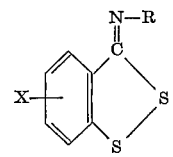

wherein X=H, halo, nitro or a monovalent alkyl radical; and R represents a hydroxylic or acyloxylic radical. Some of the compounds comprised in the general Formula 1 are known, but in none of them an anti-fungus activity has previously been found. Most of them, however, are new compounds. Furthermore, the benzotrithiones substituted in the benzene nucleus, which serve as intermediates are new and form a further object of the present invention.

A suitable method of preparation of the compounds comprised in the general Formula 1 comprises treating optionally substituted benzotrithione with hydroxylamine and successively with an alkyl halide or with the anhydride of an acid. Among the compounds of the general Formula 1, the following have proven to be particularly effective as regards their anti-fungus activity:

(1) 3-oximino-benzo-1,2-dithiol, M.P. 210° C. (benzene-petroleum ether) [McClelland (1936); Mameli Menessier (1932)]
(2) 3-acetoximino-benzo-1,2-dithiol, M.P. 107–108° C. (ligroin)
(3) 3-butryloximino-benzo-1,2-dithiol, M.P. 53–54° C. (petroleum ether)
(4) Monosuccinic ester of 3-oximinio-benzo-1,2-dithiol, M.P. 146–148° C. (ethanol)
(5) 3-benzoyloximino-benzo - 1,2 - dithiol, M.P. 147° C. (ethanol) [Mameli Menessier (1932)]
(6) 3-oximino-5-methyl-benzo-1,2-dithiol - M.P. 192° C. (benzene)
(7) 3-oximino-5-bromo-1,2-dithiol - M.P. 188° C. (benzene-ligroin)
(8) 3-oximino-5-chloro-benzo - 1,2 - dithiol, M.P. 187°–188° C. (benzene)
(9) 3-oximino-5-nitro-benzo-1,2-dithiol, M.P. 198°–199° C. (benzene-petroleum ether)
(10) 3-propionyloximino-benzo-1,2-dithiol, M.P. 88° C. (ligroin)
(11) 3-2-chloroacetyloximino-benzo - 1,2 - dithiol, M.P. 113° C. (ethanol)
(12) 3-p-chlorobenzoyl oximino - benzo-1,2-dithiol, M.P. 182° C. (methanol)
(13) 3-p-methylbenzoyl oximino-benzo-1,2-dithiol, M.P. 170° C. (ethanol)
(14) 3-β-phenylpropionyl oximino-benzo - 1,2 - dithiol, M.P. 95° C. (ethanol).

As stated above, the compounds of this invention distinguish themselves for their anti-fungus action.

These compounds have been found to be active, e.g. against *Candida albicans* and *Trichophyton mentagrophytes*, against *Fusicladium dendriticum* and Peronospora.

Hereinbelow are given some data on the activity against *Candida albicans* and *Trichophyton mentagrophytes*.

The data reported in Table 1 under M.I.C. indicate the minimum inhibiting concentration in Sabouraud broth of the various substances in the following concentrations expressed in γ/cc.: 100, 50, 20, 10, 2, 1, 0.5. The * which specify some concentration values, lower than 100 N/cc. and not fungistatic, show that the given concentration is the solubility limit of the substance tested in the culture broth.

TABLE 1

| | M.I.C. (γ/ml.) | |
|---|---|---|
| | Candida albicans | Trichlophyton mentagrophytes |
| Compound No.: | | |
| 1 | 5 | 5 |
| 2 | 5 | 5 |
| 3 | 5 | 5 |
| 4 | 5 | 5 |
| 5 | >20* | 5 |
| 6 | 10 | 5 |
| 7 | 2 | 2 |
| 8 | 5 | 2 |
| 9 | 5 | 1 |

The numbers which appear in Table 1 represent the order in which the compounds are listed above.

The activity of the compounds comprised in the general Formula 1 against *Fusicladium dendriticum* (wall.) Fuch, *Peronospora tabacina* (Adam) and *Erisiphe cichoracearum F. cucurbitate* is shown by the following data reported in Table 2 and obtained from tests carried out with the following technique:

The test plants (apple tree for *F. dentritucum*, tobacco for *P. tabacina*) are treated by spraying the upper and lower side of the leaves with aqueous solutions or suspensions containing the products to be tested in the desired concentrations. As soon as the deposits of the treatment are dried, the plants are brought in a conditioned room (minimum temperature 17° C., maximum temp. 31° C.; relative humidity, minimum 43%, maximum 88%, photoperiod 15 hours. The lighting is given by a ceiling fixture consisting of 5 white-light fluorescent tubes of the Philips TLF 40 W type and 6 U.V. fluorescent tubes of the Sylvania 360 BL 40 W type per m.$^2$ of surface) where they remain for 24 hours. At about half the night period, the treated plants are sprayed with distilled water. After the said 24 hours, plants are infected by spraying on the upper side of the leaves an aqueous suspension of Conidia (200,000 conidia/cc.) and introducing immediately the plants into the infection cell where they remain for 24 hours at a constant temp. of 18° C.±1, with a relative humidity of 100%. The photoperiod of 15 hours is per day with the lighting supplied by two white-light fluorescent tubes of the Philips TLF 40 W type per 7 m.$^2$ of surface.

After this period, the plants are brought into a room having a temperature of 19° C.±1, relative humidity of about 85% and photoperiod of 15 hours/day. The lighting is given by a ceiling fixture provided with 5 white-light fluorescent tubes of the Philips TLF 40 W type per m.$^2$ of surface; after 15 days (*F. dendriticum*) and 8 days (*P. tabacina*) the results are determined by observing the infection degree of the leaves. The minimum concentration of active substance capable of totally inhibiting the infection (threshold of activity) is thus established.

For the antiodic estimation, aqueous suspensions having different concentrations of the active compounds, are sprayed upon cucumber plants, grown in conditioned room when they reached the stadium of two true leaves. After drying, said plants are aged for 24 hours in a room under conditions of an average summer day (minimum night temp. 18° C., max. day temp. 31° C., photoperiod 15 hrs.; flood lighting by fluorescent tubes+U.V.). Thereafter, they are infected by a dry distribution of conidia of *Erisiphe cichoracearum F. cucurbitae* drawn from infected material. After the infection, the inoculated plants are incubated for 21 days at 21° C., 75% relative humidity and a photoperiod of 14 hours. After this period, the infection degree of the leaves is determined indicating the minimum concentration of the active substance capable to inhibit the infection.

TABLE 2

| | Threshold of activity on fungi in percent concentration of active substance | | |
|---|---|---|---|
| | F. dendriticum | P. tabacina | Oidium |
| Compound No.: | | | |
| 1 | 0.0003 | 0.0125 | 0.0125 |
| 2 | 0.0125 | 0.006 | |
| 8 | 0.0125 | 0.006 | |

The numbers which appear in Table 2 represent the order in which the compounds are listed above.

It is well known to people skilled in the art of preventing and treating fungus disease of plants, that for treatment, solutions and suspensions containing an average of 0.1% to 0.3% of active substances are used, namely concentrations which are much higher than the concentrations which are the threshold of activity of these compounds.

It is therefore evident that there is the prospective utility of use in agriculure as phytodrugs. It can also be noted from the total data of activity reported above, that these compounds have a wide specrum of activity, which makes it possible to extend the application possibilities also to the industrial field.

The purposes of this invention can therefore be summarized as follows: to supply effective substances for the anti-fungus control in the agricultural and industrial field, to disclose a process for obtaining them, and disclose compositions containing at least one of these substances, suitable to be applied against fungi. These substances can, in some cases, be used directly as such but mostly they are associated with solid, liquid, gaseous media which serve to transfer the anti-fungus agent on the surfaces to be treated and to obtain the desired concentrations of active principle. The solids can be: clay, caolin, talc, diatomaceous earth, mica, silica, celites, bentonites, etc. The liquids, which are selected among the solvents for the compounds comprised in the Formula 1 or among media which are not solvents per se, but can disperse or dissolve the active ingredients by means of a coadjuvant medium, can be, for instance: water, alcohols, ketones, aromatic and aliphatic hydrocarbons, esters of aliphatic and aromatic acids, ethers, esters-ethers, etc. The gaseous media can be selected among air, nitrogen, carbon dioxide, methyl chloride and freon, etc.

The co-adjuvant media are preferably selected from commercially available surface-active agents belonging to the classes of non-ionic agents (polyoxyethylenalkylarylethers, sorbitol polyoxyethylenmonolaurate, etc.), cationic agents (alkyldimethylbenzyl-ammonium chloride, alkylpyridinium chloride, etc.), anionic agents (salts of an alkylbenzenesulfonic acid, salts of lignin sulfonic acid, sulfates of higher alcohols, etc.), ionic agents with a double function (dreivatives of laurylamine, alkyldimethylbetaine, dodecylaminoethylglycine, etc.).

The preparation of the compositions which contain as an active ingredient at least one of the substances according to the invention, optionally associated with others having a different action (e.g. insecticides, fertilizers, etc.), presents no partcular difficulties since it can be carried out by using the means of the prior art. For instance, in order to prepare a wettable powder type composition which is normally used in agriculture against cryptogames, we proceed as follows: the active substance is intimately mixed with inert substances or fillers such as caolin, talc, bentonite, etc., adding a suitable dispersing agent such as e.g., sodium or calcium dodecylbenzenesulfonate, sodium butylnaphthalene-sulfonate or sodium lauryl sulfonate. The mixture is ground to the fineness required for reaching a good suspension of the obtained powder in water.

In order to carry out a treatment on the lead surface of a plant to be protected against the infection by means of a formulation of this type, the powder is suspended in water in such amount as to reach the desired concentration. Thus, a finely divided suspension is obtained which makes it possible by spraying to obtain a uniform distribution on the surface treated with the anti-fungus agent.

A powder for the dry use is prepared by mixing the active substance with inert substances and fillers of the aforementioned type and by grinding down to the desired fineness.

The following examples illustrate the invention without limiting its scope.

EXAMPLE 1

Benzo-1,2-dithiol-3-one was dissolved in boiling ethanol. Sodium acetate and hydroxylamine were added.

The whole was refluxed for 10 minutes, then cooled and the oxime was precipitated with $H_2O$ and crystallized twice from alcohol. 3-oximino-benzo-1,2-dithiol was obtained in the form of needle-shaped light-yellow crystals. M.P. 210 (benzene-petroleum ether)-light yellow needles, soluble in ethyl acetate and acetone and unsoluble in ligroin [Mameli-Menessier (1932); McClelland (1936)].

EXAMPLE 2

4,4'-dimethyldiphenyldisulfide - 2,2' - dicarboxylic acid (M.P. 291° C.) was dissolved in ten times its weight of anhydrous pyridine and treated with an equal amount of phosphor pentasulfide. The whole was refluxed for one hour. After cooling, the reaction mixture was diluted with 4 volumes of water. After standing for one hour at 0° C., the precipitate was filtered and washed with water. A yield of raw product of 80% of the stoichiometric was obtained. By crystallization from ethanol and from ligroin, red crystals of 5-methyl-benzo-1,2-dithiol-3-thione, having M.P. 95° C. were obtained.

This product was treated with hydroxylamine and by operating as in Example 1, yellow flakes of 3-oximino-5-methyl-benzo-1,2-dithiol-3-thione, M.P. 192° C. (benzene) soluble in ethanol and ethyl acetate but insoluble in petroleum ether, were obtained.

Calcd. (percent): C, 48.7; H, 3.6; N, 7.1; S, 32.5. Found (percent): C, 48.8; H, 3.6; N, 7.1; S, 32.4.

EXAMPLE 3

By starting from 4,4'-dibromo-diphenyldisulfide, 2,2'-dicarboxylic acid (M.P. 310–312° C.) and operating under the conditions of Example 2, 5-bromo-benzo-1,2-dithiol-3-thione was obtained. This compound was in the form of red needles with an M.P. 137–138° C. (benzene-petroleum ether).

Calcd. (percent): C, 31.9; H, 1.1; S, 36.5; Br, 30.4. Found (percent): C, 31.7; H, 1.0; S, 36.0; Br, 30.4.

From this compound, by treatment with hydroxylamine under the operating conditions of Example 1, 3-oximino-5-bromo-benzo-1,2-dithiol having an M.P. 188° C. (benzene-ligroin) was obtained. It was a bright yellow crystalline powder soluble in acetone and ethyl acetate.

Calcd. (percent): C, 32.1; H, 1.5; Br, 30.5; S, 24.5. Found (percent): C, 32.1; H, 1.5; Br, 30.6; S, 24.5.

EXAMPLE 4

5-chloro-benzo-1,2-dithiol-3-thione was prepared in the form of red crystals, M.P. 132°–134° C. (ethanol and ligroin) in a first step, starting from 4,4'-dichloro-phenyldisulfide-2,2'-dicarboxylic acid (M.P. 316–320° C. ethanol) by operating as in Example 2.

Calcd. (percent): C, 38.4; H, 1.4; S, 44.0. Found (percent): C, 38.5; H, 1.4; S, 44.2.

This compound, treated with hydroxylamine yielded 3-oximino-5-chloro-benzo-1,2-dithiol, M.P. 187°–188° C. (benzene) in the form of bright yellow needles, soluble in ethanol and ethyl acetate, and insoluble in petroleum ether.

Calcd. (percent): C, 38.6; H, 1.9; Cl, 16.3; S, 29.5. Found (percent): C, 38.9; H, 1.8; Cl, 16.4; S, 29.0.

EXAMPLE 5

5-nitrobenzo-1,2-dithiol-3-thione was obtained in the form of red crystals, M.P. 173° C. with decomposition (ethyl acetate) from 4,4' - dinitrophenylsulfide - 2,2'-dicarboxylic acid, decomposed above 280° C., by operating as in Example 2.

Calcd. (percent): C, 36.7; H, 1.3; S, 41.9. Found (percent): C, 36.8; H, 1.4; S, 44.

By treating, in a second step, this compound with hydroxylamine and operating as in Example 1, 3-oximino-5-nitro-benzo-1,2-dithiol—M.P. 198°–199° C. (benzene-petroleum ether) was obtained in the form of bright yellow crystalline powder soluble in chloroform and acetone.

Calcd. (percent): C, 36.8; H, 1.8; N, 12.3; S, 28.1. Found (percent): C, 36.8; H, 1.8; N, 12.4; S, 27.7.

EXAMPLE 6

The acetoxyimino-benzo-1,2-dithiol (2) can be obtained by adding dropwise while stirring a 10% solution of 3-oximino-benzo-1,2-dithiol- in anhydrous pyridine to 1.1 moles of acetyl chloride. The whole was kept at room temperature for one hour. The mass thereafter, diluted with water and ice, yielded a precipitate which was filtered and carefully washed with very cold diluted hydrochloric acid and then with water.

The product (2) was crystallized from ligroin, M.P. 107–108° C. as a bright yellow crystalline powder soluble in acetone, ethyl acetate and chloroform, and insoluble in petroleum ether.

Calcd. (percent): C, 48; H, 3.1; N, 6.2; S, 28.5. Found (percent): C, 48; H, 3.1; N, 6.3; S, 28.5.

By operating as described above and using as intermediate butyroyl chloride, benzoyl chloride, 2-chloroacetyl-chloride, propionylchloride, p.methylbenzoylchloride, β-phenylpropionylchloride and p.chlorobenzoylchloride, the following compounds were, respectively, obtained:

3-butyryl-oximino-benzo-1,2-dithiol (3)—M.P. 53°–54° C. (petroleum ether)—bright yellow needles soluble in ethanol and ethyl ether.

Calcd. (percent): C, 52.1 H, 4.4; S, 25.3. Found (percent): C, 52.3; H, 4.2; S, 25.2.

3-benzoyloximino-benzo - 1,2-dithiol-(5)—M.P. 147° C. (ethanol)(Mameli, Menessier)—yellow needles soluble in acetone, insoluble in petroleum ether.

3-propionyloximino-benzo-1,2-dithiol, M.P. 88° C. (ligroin) as yellow crystals

Found (percent): C, 50.36; H, 3.57. Calcd. (percent): C, 50.19; H, 3.79.

3-2-chloracetyloxyimino-benzo-1,2-dithiol, M.P. 113° C. (ethanol) as yellow crystals Found (percent): C, 41.931; H, 2.27. Calcd. (percent): C, 41.62; H, 2.33.

3-p-methylbenzoyloximino-benzo-1,2-dithiol, M.P. 170° C. (ethanol), in yellow crystals Found (percent): C, 59.82; H, 3.49. Calcd. (percent): C, 59.78; H, 3.68.

3-β-phenyl-propionyloximino-benzo-1,2-dithiol- M.P. 95° C. (ethanol) in yellow crystals Found (percent): C, 60.84; H, 4.1. Calcd. C, 60.93 H, 4.15.

3-p.chloro-benzoyloximino-benzo-1,2-dithiol, M.P. 182° C. (methanol) in yellow crystals Found (percent): C, 52.23; H, 2.5. Calcd. (percent): C, 52.25; H, 2.5.

EXAMPLE 7

A 4% solution of 3-oxyimino-benzo-1,2-dithiol in anhydrous symmetrical tetrachloroethane was treated with succinic anhydride in the molar ratio of 1:1.5 by heating to 120° C. for 15 minutes. The reaction mass was cooled and extracted with a sodium bicarbonate solution. The aqueous solution, treated with charcoal and filtered, was cooled and highly acidified. The monosuccinic ester of 3-oximino-1,2-dithiol (4) precipitate thus obtained was filtered and washed with water. It was crystallized from ethanol, M.P. 146°–148° C.—light yellow crystalline powder soluble in acetone, insoluble in ligroin.

Calcd. (percent): C, 46.6; H, 3.2; N, 4.9; S, 22.6. Found (percent): C, 47.0; H, 3.1; N, 4.8 S, 22.4.

EXAMPLE 8

20 g. of 3-oximino-benzo-1,2-dithiol were intimately mixed with 74 g. of diatomaceous earth and with 2 g. of sodium lauryl sulfate and with 4 g. of sodium oleyl methyltaurinate. This mixture was ground until a powder passing completely through a 325 mesh sieve was obtained.

EXAMPLE 9

30 g. of 3-oximino-benzo-1,2-dithiol were intimately mixed with 62 g. of celite, 4 g. of sodium naphthylmethane sulfonate, with 2 g. of sodium dodecylbenzene sulfonate and 2 g. of sodium butyl-naphthalene sulfonate. This mixture was ground until a powder passing completely through a 325 mesh sieve was obtained.

EXAMPLE 10

3 g. of oximino-5-chloro-benzodithiol were added while intimately mixing to 97 g. of talc. The mixture was ground until a powder passing completely through a 230 mesh sieve was obtained.

The solvents in parentheses, after some compounds, are the media from which they were precipitated.

We claim:
1. Monosuccinic ester of 3-oximino-benzo-1,2-dithiol.
2. 3-propionyloximino-benzo-1,2-dithiol.
3. 3-2 chloro-acetyl-oximino-benzo-1,2-dithiol.
4. p-methylbenzoyl-oximino-benzo-1,2-dithiol.
5. β-phenyl propionyl-oximino-benzo-1,2-dithiol.
6. Chloro-benzoyloximino-benzo-1,2-dithiol.

References Cited

UNITED STATES PATENTS 3,141,891   7/1964   Kingsberg _____ 260—327
3,414,653   12/1968  Montagne et al. _____ 424—277

FOREIGN PATENTS 1,504,150   10/1967  France _____ 260—327

OTHER REFERENCES

Raoul et al., C. A. 54: 18478-9 (9–60).
Smith, Open-Chain Nitrogen Compounds (Benjamin, New York, January 1966), pp. 46–7.

HENRY R. JILES, Primary Examiner

C. M. SHARKO, Assistant Examiner

U.S. Cl. X.R.

424—277